2,899,540
ELECTRIC LANTERN

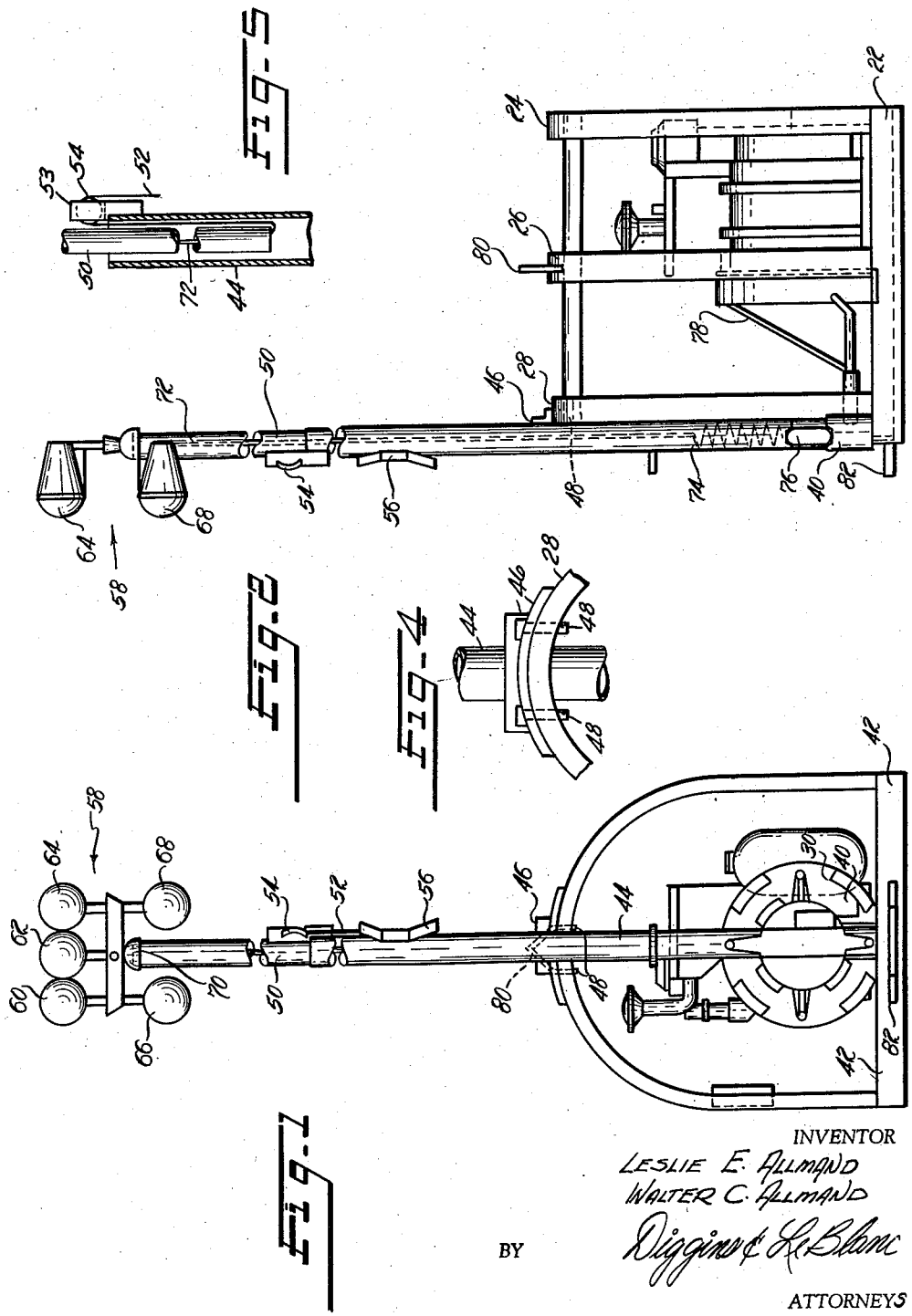

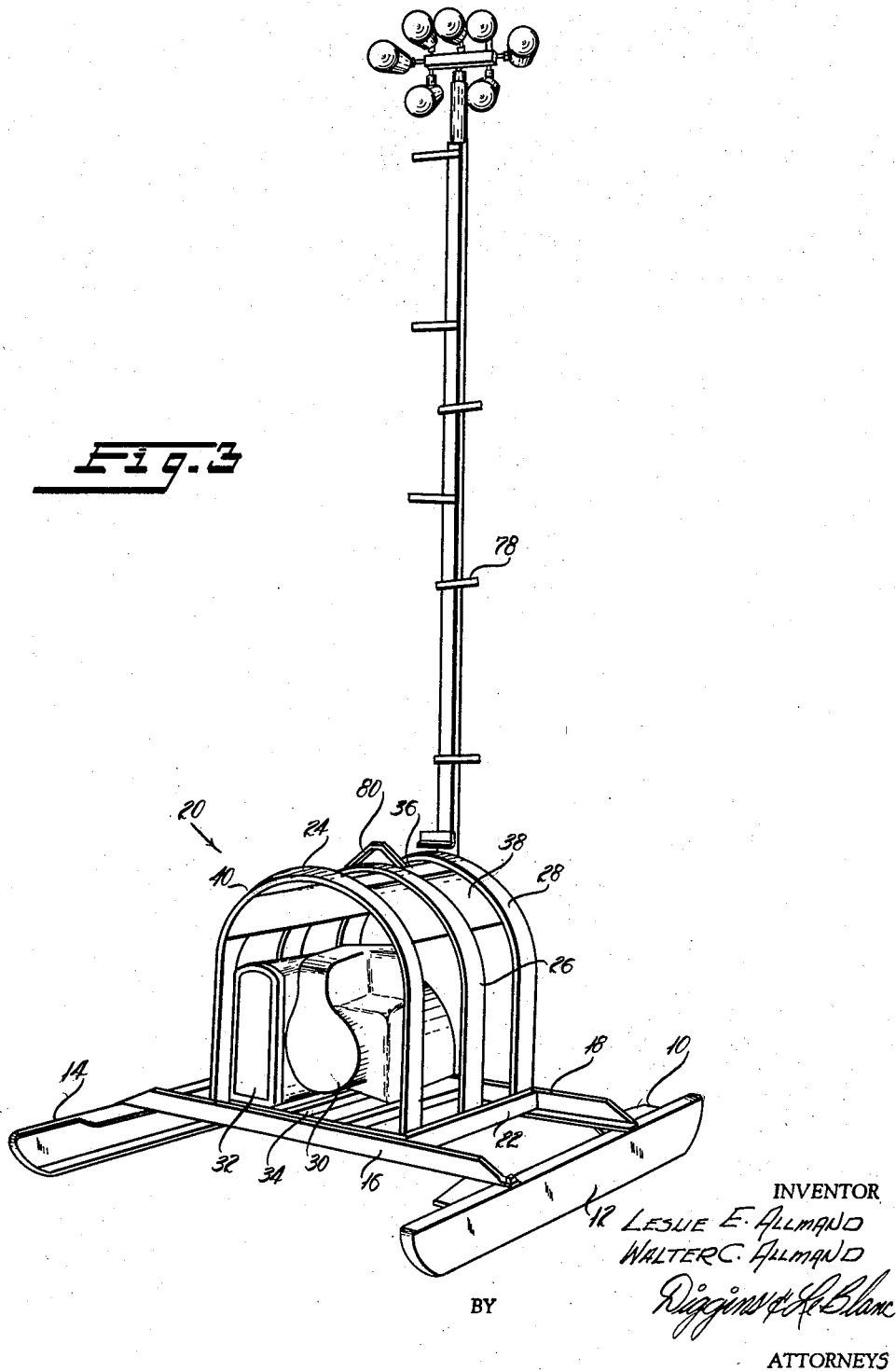

Leslie E. Allmand and Walter C. Allmand,
Holdrege, Nebr.

Application May 4, 1956, Serial No. 582,869

5 Claims. (Cl. 240—10.5)

This invention relates to an electric lantern and more particularly relates to a self contained portable electric lantern.

In construction work it is frequently desirable to have a portable source of illumination which may be easily placed at the spot desired and which is capable of producing adjustable illumination from a relatively high level. While numerous portable high level illuminators have been known heretofore, many of these were designed primarily for theatrical and photographic illumination and are mounted upon dollies having casters to facilitate rolling them about a floor. These devices generally are not supplied with their own source of power and are totally unsuited to construction work wherein they might be placed in slush, mud or snow and exposed to the elements. The construction lights heretofore available have for the most part consisted of relatively heavy wheeled vehicles containing a motor generator and having low level lights mounted thereon with provision for entirely separate high level lamps supported on separate standards mounted in the ground. These devices are of relatively high cost, are difficult to move to the desired location over extremely rough ground, and are not adapted to ease of transportation.

It is accordingly a primary object of the present invention to provide a portable self powered illumination device capable of providing high level adjustable illumination.

It is another object of the invention to provide a portable source of high level illumination which may be easily transported and which is adapted to use on rough terrain and in mud and snow.

It is another object of the invention to provide an illuminating device of the foregoing type which is simple and rugged in construction and which may be easily assembled and disassembled.

These and further objects and advantages of the invention will become apparent upon reference to the following specification and claims and the appended drawings wherein:

Figure 1 shows a vertical elevation of a portable illuminating device of this invention.

Figure 2 is a further vertical elevation of the portable illuminating device of this invention;

Figure 3 is a perspective view of the portable illuminating device of the invention showing certain features in addition to those shown in Figures 1 and 2;

Figure 4 is a detailed elevation view of a portion of the portable illuminating device, viewed from the right of Figure 2; and Figure 5 is an enlarged view of the pulley arrangement of Figures 1 and 2.

Referring to the figures of the drawing and particularly to Figure 3, there is seen a sub-base 10 consisting of a pair of runners 12 and 14 which are attached together by a pair of transverse angle members 16 and 18. Mounted between the angle members 16 and 18 is a skeletal housing illustrated generally at 20 which consists of a rectangular frame 22 to which are attached a series of inverted U-shaped members 24, 26 and 28. The tops of the inverted U-shaped members 24, 26 and 28 are attached to a transverse member 36, as by welding, and a pair of guard plates 38 and 40 may be fastened to the underside of these members. A motor generator 30 and fuel tank 32 are mounted upon transverse members 34 in the frame 22 and are located substantially between U-shaped frame members 24 and 26 for a purpose presently to become apparent. The housing 20 is attached to the sub-base 10 by means of screws or any other suitable securing means.

The inverted U-shaped member 28 is secured to the bottom frame 22 short of the end thereof, as seen in Figure 2, and a socket 40 is mounted upon the transverse member 42. A hollow light standard 44 is received in the socket 40 and is provided with a bracket 46 which receives a pair of anchor pins 48 which mate with apertures in inverted U-shaped member 28 to lock the standard to the housing. The standard 44 is of the telescoping type and contains an inner section 50 which slides within the standard 44 and which may be elevated by means of a chain or rope 52 passing over a pulley 54 supported by a suitable bracket 53 on standard 44 and secured to the inside of the lower end of the section 50 as best seen in Figure 5. A chain anchor 56 is provided for securing the end of the chain 52.

A light assembly 58 consisting of a plurality of lights 60, 62, 64, 66 and 68 is mounted atop the telescoping member 50 by means of a cap 70 which is secured to the telescoping member by means of set screws, not shown. The lamps 60–68 are secured to their support in any conventional adjustable manner. Power is supplied to the lights by means of a cable 72, best seen in Figure 2, which is coiled at 74 in the bottom of the standard and which is connected through connection 76 to the generator 78. Referring to Figure 3, the standard may be provided with climbing bars 78 for use when replacing or adjusting the bulbs. A lifting ring 80 is attached to the top of inverted U-shaped member 26 by any suitable means, such as welding, to provide for easy lifting of the unit. A towing ring 82 is attached to the central portion of the member 42 to provide for mobility of the unit without lifting.

In normal usage the light standard is removed from the housing when transporting the unit to the work site and the unit is lifted by the use of a crane attached to the housing by means of lifting ring 80. The light standard is easily and quickly detached and attached to the housing by simply lifting the standard from socket 40 whereby pins 48 are lifted upwardly out of the apertures in member 28. The lamps are easily disconnected at the connector 76. All wiring is in a protected position and is not subject to damage.

The housing may be used with or without skids depending upon whether or not it is desirable to move the unit without lifting after it has been placed. When the unit is delivered to the site, it is lifted from the truck or other conveyance and it may then either be carried by a lifting device or pulled upon its skids to the ultimate site of use. The skids make the device mobile over practically any type of terrain and the easy removability of the light standard makes it possible to remove the lights if excessive rough riding is to be encountered. Once situated at the site of use the unit is completely integrated and the lights may be adjusted by a workman mounting the climbing bars 78 shown in Figure 3. It will be noted that the motor generator unit is situated at a point remote from the light standard 44 so that the weight of the motor generator unit prevents tipping of the device when a workman climbs the light standard. The housing 20 protects the motor generator unit and gas tank and also serves as a base and mounting for the light standard.

It will be apparent from the foregoing that I have provided a portable illumination unit which is simple, rugged, easily transported and adapted to use on sites where previously available equipment was not easily located.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A portable illuminating device comprising a rectangular skeletal base having side members and transverse members, a plurality of spaced inverted U-shaped members having their depending legs attached to said side members, a member connecting the bights of said U-shaped members together, a socket on one of said transverse members, a hollow light standard removably received in said socket, means on said light standard cooperating with means on the bight of one of said U-shaped members adjacent said transverse member carrying said socket for removably conecting said standard to said U-shaped member, a telescoping section received in said standard, a plurality of lamp sockets adjustably mounted atop said telescoping section, means for raising and lowering said telescoping section within said light standard, and a power cable for connection to said lamp sockets and extending downwardly therefrom through said telescoping section and said standard and having a portion thereof coiled in said standard.

2. A portable illuminating device comprising a rectangular skeletal base having side members and transverse members, a plurality of spaced inverted U-shaped members having their depending legs attached to said side members, a member connecting the bights of said U-shaped members together, a socket on one of said transverse members, a hollow light standard removably received in said socket, means on said light standard cooperating with means on the bight of one of said U-shaped members adjacent said transverse member carrying said socket for removably connecting said standard to said U-shaped member, a telescoping section received in said standard, a plurality of lamp sockets adjustably mounted atop said telescoping section, a pulley mounted for free rotation on the upper end of said light standard, a flexible member extending from outside said standard around said pulley downwardly through said light standard and secured to the lower end of said telescoping section, a power cable for connection to said lamp sockets and extending downwardly therefrom through said telescoping section and said standard and having a portion thereof coiled in said standard, and means attached to said skeletal base for mounting a motor generator at an end of said base removed from said standard.

3. A device as set out in claim 2 wherein said means on said light standard comprises a bracket carrying a plurality of pins which cooperate with a plurality of apertures in the bight of said U-shaped member to which said standard is attached.

4. A device as set out in claim 2 including a pick-up hook mounted on the bight of one of said U-shaped members between a vertical line passing through the center of gravity of a motor-generator mounted on said base and said standard and a towing ring secured to the forward end of said skeletal base.

5. A device as set out in claim 1 including a pair of skids attached together by a pair of transverse supports, said transverse members of said base being secured to said transverse supports.

References Cited in the file of this patent
UNITED STATES PATENTS

| | | |
|---|---|---|
| 1,409,574 | Rasmussen | Mar. 14, 1922 |
| 2,360,420 | Hill | Oct. 17, 1944 |
| 2,364,155 | Martineau | Dec. 5, 1944 |
| 2,694,573 | Walker | Nov. 16, 1954 |

FOREIGN PATENTS

| | | |
|---|---|---|
| 19,062 | Australia | Mar. 22, 1930 |
| 329,420 | Great Britain | May 22, 1930 |